US012668064B2

(12) United States Patent
Oropesa Fisica et al.

(10) Patent No.: US 12,668,064 B2
(45) Date of Patent: Jun. 30, 2026

(54) MONITORING OF FLUID SUPPLY

(71) Applicant: Hewlett-Packard Development Company, L.P., Spring, TX (US)

(72) Inventors: Ana Oropesa Fisica, Sant Cugat del Valles (ES); Dorkaitz Alain Vazquez Fernandez, Sant Cugat del Valles (ES); Oscar Gomez Camps, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 182 days.

(21) Appl. No.: 18/259,812

(22) PCT Filed: Jan. 29, 2021

(86) PCT No.: PCT/US2021/015658
§ 371 (c)(1),
(2) Date: Jun. 29, 2023

(87) PCT Pub. No.: WO2022/164439
PCT Pub. Date: Aug. 4, 2022

(65) Prior Publication Data
US 2024/0066884 A1 Feb. 29, 2024

(51) Int. Cl.
*B41J 2/175* (2006.01)
*G06K 15/00* (2006.01)

(52) U.S. Cl.
CPC ....... *B41J 2/17566* (2013.01); *B41J 2/17596* (2013.01); *G06K 15/005* (2013.01); *G06K 15/4075* (2013.01)

(58) Field of Classification Search
CPC .... B41J 2/175; B41J 2/17506; B41J 2/17509; B41J 2/1752; B41J 2/17523; B41J 2/17566; B41J 2/17596; G06K 15/005
See application file for complete search history.

(56) References Cited

U.S. PATENT DOCUMENTS 5,418,557 A * 5/1995 Pullen ..................... B41J 2/195
347/7
6,196,668 B1 * 3/2001 Bode .................... B41J 2/17509
347/85
(Continued)

FOREIGN PATENT DOCUMENTS

JP 2002-178531 A 6/2002
JP 2007-105923 A 4/2007
(Continued)

*Primary Examiner* — Anh T Vo
(74) *Attorney, Agent, or Firm* — Jordan IP Law, LLC

(57) ABSTRACT

A method of monitoring a fluid supply is provided, the fluid supply including a supply tank, an intermediate tank and a fluid pump operatively coupled to the supply tank and the intermediate tank; the method comprising with the intermediate tank having a defined first fluid level, starting to feed fluid from the intermediate tank; when a defined amount of fluid has been fed from the intermediate tank, with the feeding of fluid from the intermediate tank proceeding, activating the fluid pump to supply fluid from the supply tank to the intermediate tank; monitoring the fluid level of the intermediate tank while the fluid pump remains activated; and diagnosing operation of the fluid pump as a function of the fluid level of the intermediate tank.

20 Claims, 4 Drawing Sheets

(56)         References Cited

U.S. PATENT DOCUMENTS

| | | | |
|---|---|---|---|
| 6,375,299 | B1 | 4/2002 | Foster et al. |
| 9,079,408 | B2 | 7/2015 | Suzuki et al. |
| 9,102,157 | B2 | 8/2015 | Prothon et al. |
| 10,464,334 | B2 | 11/2019 | Pagnon et al. |
| 2005/0162681 | A1 | 7/2005 | Ng et al. |
| 2010/0271451 | A1* | 10/2010 | Burress ................. B41J 29/393 |
| | | | 347/103 |
| 2011/0285767 | A1* | 11/2011 | Tanaka .................... B41J 2/175 |
| | | | 347/6 |
| 2018/0170066 | A1* | 6/2018 | Ohtsu ....................... B41J 2/18 |

FOREIGN PATENT DOCUMENTS

| | | | |
|---|---|---|---|
| WO | 2013/117919 | A1 | 8/2013 |
| WO | 2016/076884 | A1 | 5/2016 |
| WO | 2018/226242 | A1 | 12/2018 |

* cited by examiner

210 — Feed Fluid from Intermediate Tank

220 — Defined Amount of Fluid fed?

No

Yes

230 — Supply Fluid to the Intermediate Tank

240 — Monitor Fluid Level of Intermediate Tank

250 — Diagnose Pump Operation

MONITORING OF FLUID SUPPLY

BACKGROUND

In some printing systems, a printhead receives a stream of printing fluid from an intermediate tank which is supplied with printing fluid from a supply tank via a fluid pump. Printing fluid can be fed from the intermediate tank to the printhead during printing while refilling the intermediate tank from the supply tank.

DESCRIPTION OF DRAWINGS

The following detailed description will best be understood with reference to the drawings, wherein.

DESCRIPTION OF EXAMPLES

Figure 1:
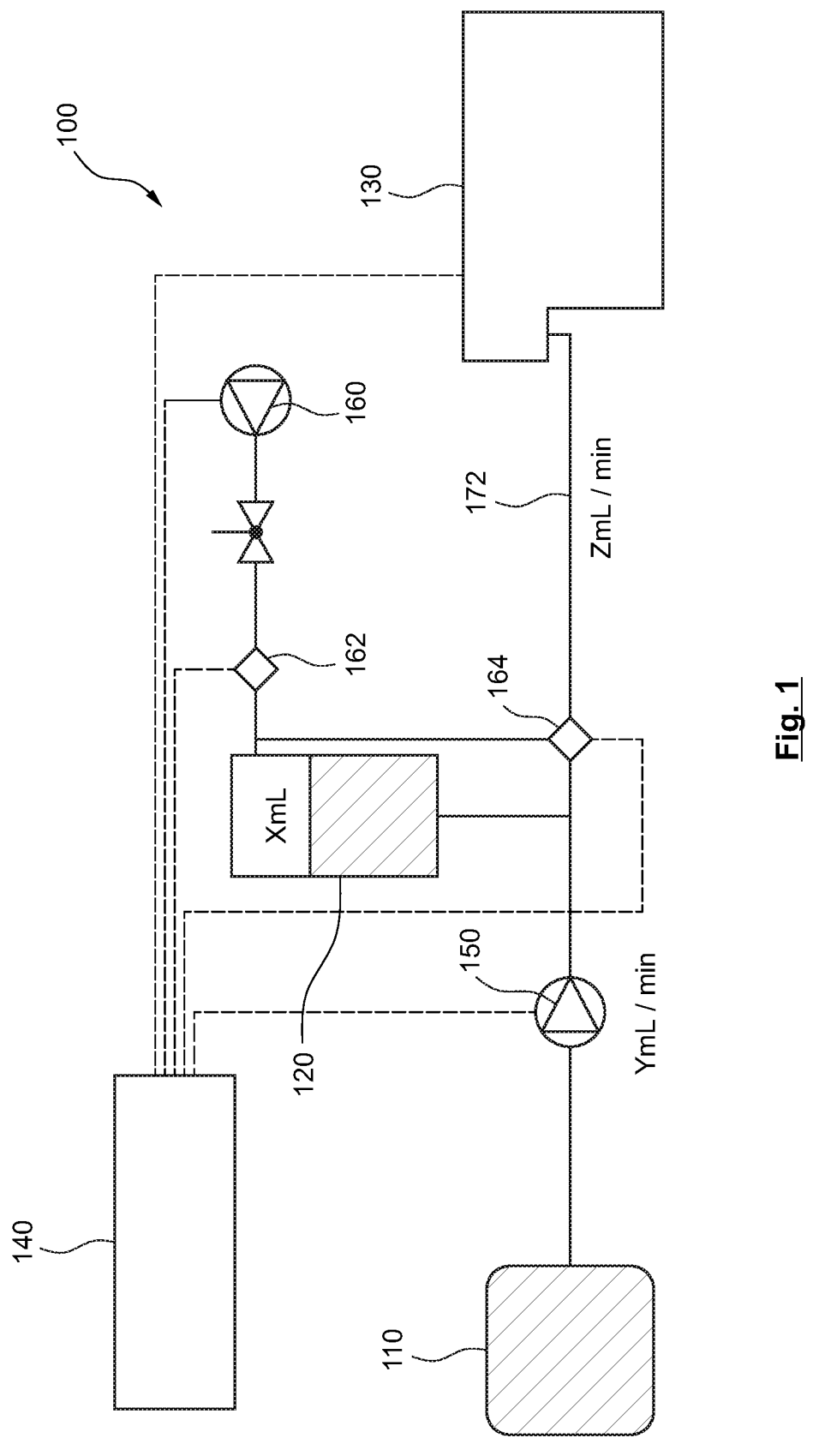
FIG. 1 shows a schematic diagram of a printer according to an example.

FIG. 1 shows a schematic diagram of a printer 100 according to an example. In the example described, the printing fluid may be an ink, such as a color ink, including CMYK inks, and white ink. The ink may be a latex ink or another type of ink. In other examples, the printing fluid can be a type of conditioning fluid used in inkjet type printers, including 2D and 3D printer. The printer may be, may include, or may be part of a desktop printer, a large format printer, a plotter or the like, for example. The printer may be a 2D printer or a 3D printer. Accordingly, in the following description, the printing fluid sometimes is referred to as ink, with the understanding that other types of printing fluids may be used.

In the example of FIG. 1, the printer 100 comprises a supply tank 110, an intermediate tank 120, a printhead 130, a controller 140, a fluid pump 150 and an air pressure pump or source 160. The printhead 130 may be part of a printer.

In this example, the intermediate tank 120 can include a variable fluid volume to contain a supply of printing fluid and a variable gas volume to receive pressurized gas, such as air, to pressurize the supply of printing fluid. The variable fluid volume may be contained in a collapsible fluid reservoir, such as a collapsible ink bag, for example. The variable gas volume may be contained in a fluid tank container surrounding the collapsible ink bag and may be separated from the variable fluid volume by the bag material. In another example, the variable fluid volume and the variable gas volume may be contained in a common fluid tank container and be separated by a flexible membrane. The variable fluid volume and the variable gas volume are arranged relative to each other in such a way that they are separated but pressure applied to the gas volume can be transferred to the fluid volume and vice versa.

The supply tank 110 can include a fluid volume larger than that of the intermediate tank 120 to refill the intermediate tank during printing. For example, the supply tank 110 may have a fluid volume of several liters, such as about 2 L, 3 L or 5 L, to contain a printing fluid supply. The intermediate tank may have a smaller maximum fluid volume, e.g. a volume of less than a liter, such as a maximum fluid volume of about 500 mL or 750 mL. The fluid pump 150 between the supply tank 110 and the intermediate tank 120 may be designed to generate a flow rate sufficient to refill the intermediate tank 120 during printing, i.e. a flow rate which is the same or larger than a maximum fluid feed rate from the intermediate tank 120 to the printhead 130. In an example, the flow rate generated by the fluid pump 150 may be in the order of 30 to 300 mL/minute or 40 to 200 mL/min, e.g. about 150 mL/min. Depending on the type and size of the printer and the application, tank volumes and fluid flows may vary. In one example, the flow rate of the fluid pump 150 may be at least 10% or at least 20% higher than the flow rate of printing fluid fed from the intermediate tank 120 to the printhead 130 during printing of a diagnostic image, as explained below.

A fill state of the fluid tanks, such as the intermediate tank or the supply tank, can be measured using a fluid level sensor. The fluid level sensor can be a physical sensor provided in the tank or can be a differential pressure sensor, for example. In this example, the fluid level sensor of the intermediate tank 120 is a pressure differential senor comprising an air pressure sensor 162 connected to an air pressure supply line in communication with the variable gas volume of the intermediate tank 120 and a fluid pressure sensor 164 connected to a fluid supply line at a fluid input or fluid output of the intermediate tank 120, as shown in FIG. 1. The differential pressure sensor may operate based on a pressure difference between the air pressure supplied to the tank and the fluid pressure inside the tank.

Printing fluid may be transferred from the intermediate tank 120 to the printhead 130 using the air pressure pump or source 160 (in the following, sometimes referred to as a pressure source), for example. Instead of air, another gas, e.g. an inert gas, can be used to generate a gas pressure on the intermediate tank 120. Accordingly, in the following description, reference to air should include also reference to another type of gas to be provided by the air pressure pump or source 160. The intermediate tank 120 may act as a buffer of printing fluid, and during normal printing operation is pressurized with air or another gas using the pressure source 160 to supply the printhead 130 with printing fluid.

The pressure source 160 operates by pressurizing the air volume inside the intermediate tank 120 and above or around the fluid volume, by applying an air pressure which cycles between a lower_threshold_pressure and an upper_threshold_pressure. For example, the air pressure may be increased to the upper_threshold_pressure by activating the pressure source 160 to force part of the fluid volume out of the intermediate tank 160 and towards the printhead 130. The pressure source 160 is deactivated upon reaching the upper_threshold_pressure, and the air pressure will decrease due to part of the fluid being discharged from the intermediate tank 120 and other factors, such as small air leaks. When the pressure reaches the lower_threshold_pressure, the air pressure source 160 may be again activated to increase the air pressure until it reaches the upper_threshold_pressure. This cycle may be repeated as long as the printer is operating to deliver printing fluid to the printhead 130. At the end of a print job or in a printing pause, the system can be depressurized.

In a similar way, printing fluid may be transferred from the supply tank 110 to the intermediate tank 120 using fluid pump 150 to refill the intermediate tank 120 upon demand. A refill operation may be triggered by a level sensor in the intermediate tank, for example. The fluid pump 150 may be a different type of pump, such as a DC motor driven fluid pump. For example, a volumetric pump may be provided, the pump having specific flowrates at respective RPMs. As another example, a centrifugal pump may provide specific flowrates at respective RPMs. Such operating conditions may be known in the diagnostic process.

For example, when the printing fluid is consumed from the intermediate tank 120, the tank may be refilled from the supply tank 110 using the fluid pump 150, which pushes printing fluid into the intermediate tank 120. In one example, the refill operation is continued until the differential pressure sensor 162-164, measuring fluid vs. air pressure, detects an end of refill state when the intermediate tank is considered full. The end of refill state can be detected by correlation of the differential pressure with a look up table of pressure values vs. fluid level, for example.

Accordingly, the level sensor 162-164 may generate an out of ink signal and/or an end of refill signal when certain fluid levels are reached. The level sensor may be a differential pressure sensor comparing the pressure of printing fluid, such as ink, versus the air or other gas pressure, to obtain differential_pressure=ink_pressure−air_pressure. This differential pressure sensor may be sensitive to pressure variations caused by temperature changes or other influences in circuits of the fluid delivery system. For example, an out of ink event may be detected based on a standard deviation of the level sensor. When this reaches a certain threshold, the intermediate tank 120 may be marked as out of ink. If a pump flow rate from fluid pump 150 is degraded, the standard deviation may be reduced and could lead to a false out of ink detection. Accordingly, in certain circumstance, the level sensor 162-164 may generate an early or false positive signal, signaling out of ink situation.

In another scenario, during a refill of the intermediate tank 120, if the intermediate tank 120 is not detected as full within a defined period of time, a time-out can occur and a system error can be created to signal malfunction of the fluid supply. Also a time-out during a refill of the intermediate tank 120 could be caused by a degraded pump flow rate.

The scenarios illustrated above may be an indication of a malfunction of the fluid pump 150 but also may be related to a failure or degradation of another component of the fluid supply, such as an obstructed fluid conduit or a wrinkle or bend in a fluid supply bag of the supply tank 110 that does not allow or impede fluid to flow out from the supply tank 110 causing a false out of ink signal, e.g. based on the standard deviation of differential pressure sensor 162-164.

Other issues can be associated with a degradation of the fluid pump, such as printhead starvation, i.e. when the printhead 130 is insufficiently supplied with printing fluid, or intermediate tank refill time-out, i.e. when refilling of the intermediate tank 120 from the supply tank 110 takes longer than expected. When an issue occurs which suggests that there is a degradation of the functionality of the fluid pump 150, a user may be inclined to call a service engineer to replace the fluid pump 150. If the issue, however, is not caused by a degraded pump, involvement of a service engineer could be avoided. Therefore, a system and method to double check, by a user, the operation of the fluid pump 150 can enhance reliability of the overall system.

A user controlled diagnosis can be implemented in a printer 100, as shown in FIG. 1, which comprises a print supply tank 110, an intermediate tank 120, a printhead 130, a fluid pump 150 in fluid communication with the print supply tank 110 and the intermediate tank 120, a fluid connection between the intermediate tank 120 and the printhead 130, a printing fluid level sensor 162, 164 at the intermediate tank 120, and a controller 140 programmed to activate the fluid pump 150 to fill the intermediate tank 120 from the print supply tank 110; deactivate the fluid pump 150 when it is detected that a defined first fluid level has been reached in the intermediate tank 120; control the printhead 130 to print a diagnostic image; reactivate the fluid pump 150 to refill the intermediate tank 120 from the print supply tank 110 after a defined portion of the diagnostic image has been printed; monitor the fluid level of the intermediate tank 120 while the fluid pump 150 is activated; and diagnose operation of the fluid pump 150 as a function of the fluid level of the intermediate tank 120.

In an example, the controller can be further programmed to diagnose operation of the fluid pump 150 as a function of a time needed to reach a defined second fluid level in the intermediate tank 120 after re-activation of the fluid pump while printing of the diagnostic image.

The printer further may comprise a user interface to prompt a user to trigger activation of the fluid pump and/or trigger printing of the diagnostic image.

Activation of the fluid pump 150 to fill the intermediate tank 120 may be preceded by the controller, e.g. via the user interface, prompting a user to provide a supply tank 110 having a defined minimum amount of printing fluid to print the diagnostic image or to verify that the supply tank 110 contains such minimum amount of printing fluid. The controller further may be programmed to prompt the user, e.g. via the user interface, to confirm that a sufficient minimum amount of printing fluid is provided in the supply tank 110 and to start a diagnostic process, including activation of the fluid pump to fill the intermediate tank 120 from the supply tank 110. After the diagnostic process has been started, it can run automatically or semi-automatically with no or little user intervention.

As indicated above, the fluid pump 150 is activated to fill the intermediate tank 120 from the supply tank 110 and is deactivated when it is detected that a defined first fluid level in the intermediate tank 120 has been reached. The defined first fluid level may correspond to a state of the intermediate tank 120 being full wherein detecting the intermediate tank 120 as "full" may correspond to a situation where 100% of a fluid volume of the intermediate tank 120 is filled or less than 100% of the fluid volume is filled, such as a filling of 80% to 75% of the fluid volume of the intermediate tank 120, for example.

As indicated above, once the defined first fluid level is detected, e.g. when it is detected that the intermediate tank 120 is "full", the controller 140 can control the printhead 132 print a diagnostic image. Print start can be triggered automatically or can be triggered by user input wherein the controller 1400 may be programmed to prompt the user to trigger printing of the diagnostic image.

The diagnostic image may be a high density image, such as a full-color image of a particular ink color for which a diagnosis of the associated pump 150 is to be performed. In a 2D printer, the diagnostic image may be a "flat" image printed on a print medium, such as paper or cardboard. In a 3D printer, the diagnostic image may include ejection of a 3D printing fluid to a print bed.

Whereas, FIG. 1 shows a printer 100 including a single supply tank 110, intermediate tank 120 and printhead 130, the printer may comprise a plurality of supply tanks, intermediate tanks and/or printheads, e.g. one for each color of Black, Cyan, Magenta and Yellow inks and possible additional inks and other fluid, e.g. a pre- or post-treatment fluid. The number of printheads may be different from the number of supply tanks and intermediate tanks because a single printhead may be to eject more than one color or type of ink.

In a printer designed for multiple types of ink, such as BCMY inks and conditioning fluids for example, a separate ink pump may be provided in respective separate fluid lines between a respective supply tank and a respective intermediate tank for each type of ink. Each fluid line may be connected to a respective fluid pressure sensor. Further, a single pressure source may be connected to each one of the respective intermediate tanks, with a single differential pressure sensor connected to the air pressure line downstream of the air pressure source or with multiple differential pressure sensor connected to air inlets of the respective intermediate tanks.

Accordingly, the controller 114 may be programmed to perform a diagnostic process for each color or each type of printing fluid individually. For example, the printer may comprise a number of pairs of a print supply tank and a intermediate tank respectively in fluid communication via an associated pump, each pair and associated pump dedicated to a selected fluid color, wherein the controller is further programmed to independently control the fluid pumps dedicated to different colors. A diagnosis may be performed individually for each of different car pumps.

As indicated above, after a defined portion of the diagnostic image has been printed, the controller may be programmed to reactivate the fluid pump 150 to refill the intermediate tank 120 from the supply tank 110. The print progress and, in particular, whether a defined portion of the diagnostic image has been printed, can be determined by measuring elapsed time since the start of printing or measuring a number of swath printed or number of print media advance steps, for example. Printing the defined portion of the diagnostic image will consume a known amount of printing fluid which is fed from the intermediate tank 120 to the printhead 130. Accordingly, by printing the diagnostic image and determining the print progress, it is possible to determine an amount of fluid which has been fed from the intermediate tank 120 to the printhead 130 at any point in time.

For example, the defined portion of the diagnostic image can be set to correspond to a defined portion of the printing fluid having been fed from the intermediate tank 120 to the printhead 130, such a portion of between 10% and 80% of a fluid volume contained in a full intermediate tank 120, e.g. about 20%, 50%, 75% of the fluid volume contained in the full intermediate tank 120.

As indicated above, after a defined portion of the diagnostic image has been printed, the controller will reactivate the fluid pump to refill the intermediate tank from the print supply tank. At that time, a fluid flow rate from the supply tank 110 to the intermediate tank 120 may be higher than a fluid flow rate from the intermediate tank 120 to the printhead 130 to refill the intermediate tank 120 while printing of the diagnostic image continues. The ratio between the fluid flow to the intermediate tank 100 and the fluid flow from the intermediate tank 110, the later one being determined by print progress of the diagnostic image, can be at least 1.1 or at least 1.2 and may be in the range of 1.1 to 2, for example.

As indicated above, while the fluid pump 150 continues to be activated and the intermediate tank 120 continues to be refilled and while further the diagnostic image continues to be printed, the fluid level of the printing fluid in the intermediate tank 120 is monitored. Based on the fluid level in the intermediate tank 120, the controller 140 is programmed to diagnose operation of the fluid pump 150.

As indicated above, the controller can be programmed to diagnose operation of the fluid pump 150 as a function of a time needed to reach a defined second fluid level in the intermediate tank 120 after re-activation of the fluid pump while printing of the diagnostic image. Diagnosis may be based on a known fluid flow rate of feeding printing fluid from the intermediate tank 120 to the printhead 130 during printing of the diagnostic image because the amount of printing fluid per time or for print progress, for printing the diagnostic image, is known. To generate a high fluid flow rate during printing of the diagnostic image, the diagnostic image may be a high density image, such as an image fully covered by a single printing fluid color. In one example, the diagnostic image may be image printed by firing all fluid nozzles of the printhead 130 at any time during each swath.

Based on a known fluid flow rate from the intermediate tank 120 to the printhead 130 and a known nominal fluid flow rate of the fluid pump 150 to feed printing fluid from the supply tank 110 to the intermediate tank 120, and further based on a known fluid level of the intermediate tank 120 at the time of activating the fluid pump 150 to refill the intermediate tank 110, the time for refilling the intermediate tank 110 up to a defined fluid level, e.g. a fluid level corresponding to a "full" state of the intermediate tank 120, can be determined. It hence is possible to calculate the time which the fluid pump 150, if operating properly, would need to refilled the intermediate tank 110. Accordingly, it is possible to diagnose operation of the fluid pump 150 as a function of time needed to refill the intermediate tank 120 up to the defined fluid level.

In one example, it is assumed that the intermediate tank 120 has a maximum fluid volume of X mL (milliliter), the fluid pump 150 is designed to generate a nominal fluid flow of Y mL/min, and the fluid flow from the intermediate tank 120 to the printhead 130 during printing of the diagnostic image is Z mL, wherein X may be in the range of 100 to 1000, such as about 120, about 500 or about 700, Y may be in the range of 30 to 200, such as about 60 or about 120, and Z may be in the range of 10 to 30, such as about 20, to give just a few examples. Depending on the type, size and application of the printing system and other factors, other fluid volumes and flow rates may apply.

In the following example, it is assumed that Y is 60 and Z is 20, i.e. the fluid pump 150 is designed to generate a nominal fluid flow of 60 mL/min, and the fluid flow from the intermediate tank 120 to the printhead 130 during printing of the diagnostic image is 20 mL. Further, in this example, it may be assumed that, after refilling the intermediate tank 120 to its maximum fluid volume of X mL, the fluid pump 150 is stopped and printing of the diagnostic image begins. After one minute of printing of the diagnostic image, Z mL printing fluid, e.g. about Z (20) mL of printing fluid, will have been fed from the intermediate tank 120 to the printhead 130, and the fluid pump 150 is reactivated to refill the intermediate tank 120 at a flow rate of Y (60) mL/min while printing of the diagnostic image continues and while fluid continues to be fed from the intermediate tank at the flow rate of Z (20) mL/min. In this example, during refill of the intermediate tank 120, the net refill rate will be (Y−Z) mL/min, e.g. about (60−20) mL/min=40 mL/min. As a result, in this example, if the fluid pump 115 operates at its nominal flow rate of Y (60) mL/min, refilling of the intermediate tank 120 to a fluid level defined as full, should take about Z:(Y−Z) min, e.g. 20:(60−20) min=0.5 min, in this example. As indicated above, the values given here are but examples and may vary to large extent depending on the type, size application of the printer at the type of diagnostic image.

Accordingly, by monitoring the time it takes to refill the intermediate tank 120, a diagnosis of the operation of the fluid pump can be performed. A time margin can be defined around an expected time ET=Z:(Y−Z) at which a refill of the intermediate tank 120 should be completed, such as TM= [Z:(Y−Z)±Margin] min, with "Margin" in a range of 5 to 10 seconds, as an example. If the intermediate tank, after reactivating the fluid pump to refill the intermediate tank, is detected as full within the time margin TM, the fluid pump 150 can be diagnosed as correctly operating. If the intermediate tank is not refilled after the maximum duration of TM has lapsed, i.e. after [Z:(Y−Z)+Margin] min, a time-out can be generated and the fluid pump 150 can be diagnosed as being degraded. If the intermediate tank is filled in a time period shorter than the minimum duration of TM, i.e. before [Z:(Y−Z)−Margin] min, the fluid pump 150 is operating at a higher flow rate than expected and this may or may not trigger a message to a user or service station.

In another example, the Margin may be zero (0) and the time from the start of the refill operation is measured. If the intermediate tank is detected as full at or before the expected time ET=Z:(Y−Z), the fluid pump 150 is diagnosed as correctly operating; and if the intermediate tank is not detected as full after elapse of the expected time ET=Z:(Y−Z), a time-out can be generated and the fluid pump 150 is diagnosed as degraded.

In yet another example, a safety margin SM can be added to the expected time ET and, if the intermediate tank is detected as full at or before the expected time ET+SM, the fluid pump 150 is diagnosed as correctly operating; and if the intermediate tank is not detected as full after elapse of the expected time ET+SM, a time-out can be generated and the fluid pump 150 is diagnosed as degraded. The safety margin SM may be in a range of 5 to 10 seconds, as an example.

In an example, the supply tank 110 may be connected to the intermediate tank 120 via a first feed line 170, with the fluid pump 150 coupled to the first feed line 170, the first feed line 170 carrying a nominal fluid flow at the rate of Y mL/min if the fluid pump 150 is operating correctly. The intermediate tank 120 may be connected to the printhead 130 via a second feed line 172, the second feed line 172 carrying a fluid flow at the rate of Z mL/min when the diagnostic image is being printed The fluid flow is directed towards the printhead or the intermediate tank by the fluid pump 150 and the pressure source 160. A fluid pressure sensor 164 is coupled to the first feed line 170, downstream of the fluid pump 150 to detect a fluid pressure in the first feed line 170 and hence in the intermediate tank 120 connected thereto. An air pressure sensor 162 is coupled between the pressure source 160 the intermediate tank 120 to detect an air pressure in the intermediate tank 120.

The supply tank 110, the fluid pump 150, the pressure source 160, the fluid pressure sensor 164 and the air pressure sensor 162 are communicatively coupled to the controller 140 wherein communication can be wireless or wired to control operation of these components and to receive feedback signals from the sensors 162 and 164 and to control a refill operation. In addition, the printhead 130 can be coupled to the same or a different controller to control the printing operation. The controller 140 can be a single control system, a distributed control system and can be implemented in hardware, firmware, software and combinations thereof.

Figure 2:
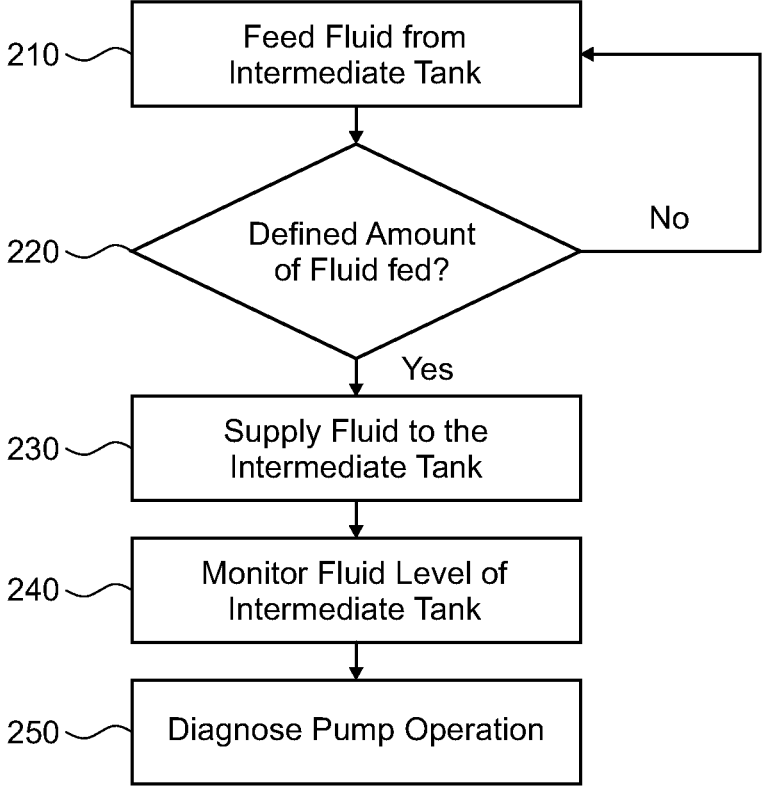
FIG. 2 shows a flow diagram of a method of monitoring a fluid supply according to an example.

FIG. 2 shows a flow diagram of a method of a monitoring fluid supply, according to an example. The method may be applied to a printer 100, including 2D and 3D printers, large-format printers and plotters, the printer 100 including a supply tank 110, intermediate tank 120 and a fluid pump 150 operatively coupled to the supply tank 110 and the intermediate tank 120. As one example, the method can be applied to the printer shown in FIG. 1 but also can be applied to other types of printers and similar devices. Use of the reference numbers as shown in FIG. 1 should not imply that the method is to be performed with the printer of FIG. 1 but it is applicable also to other printer configurations. Use of the reference numbers is for illustration purposes.

In the method of FIG. 2, starting from an intermediate tank 120 having a defined first fluid level, e.g. a fluid level corresponding to a "full" state, the fluid is fed from the intermediate tank 120, at 210. In an example, fluid can be fed from the intermediate tank 120 to the printhead 130 to print a diagnostic image, as illustrated above. During feeding/printing, the amount of fluid that is fed from the intermediate tank 120 is determined and compared to a threshold to detect whether a defined amount of fluid has been fed from the intermediate tank 120, at 220. The amount of fluid that is fed from the intermediate tank 120 can be determined based on a print progress or time elapsed when printing the diagnostic image, as illustrated above. While feeding of fluid from the intermediate tank 120 continues, when it is detected that a defined amount of fluid has been fed from the intermediate tank, at 220, the fluid pump 150 is activated to supply fluid from the supply tank 110 to the intermediate tank 120 to refill the intermediate tank 120 from the supply tank 110, at 230. While the fluid pump 150 remains activated, the fluid level of the intermediate tank 110 is monitored, at 240. In particular, it may be monitored whether the intermediate tank 110 reaches a defined fluid level, e.g. a fluid level corresponding to a "full" state. At 250, the operation of the fluid pump 150 is diagnosed as a function of the fluid level of the intermediate tank, e.g. whether it is full or not within a predetermined amount of time, as illustrated above.

Diagnosing operation of the fluid pump 150 may comprise monitoring the time period from activation of the fluid pump until a defined second fluid level of the intermediate tank is detected; and, if the time period is below a threshold value, diagnosing operation of the fluid pump as correct; and, if the time period is above the threshold value, diagnosing operation of the fluid pump as degraded. In an example, the defined first fluid level and the defined second fluid level may be the same, and at least one of the defined first fluid level and the defined second fluid level may correspond to the intermediate tank detected as full.

Figure 3:
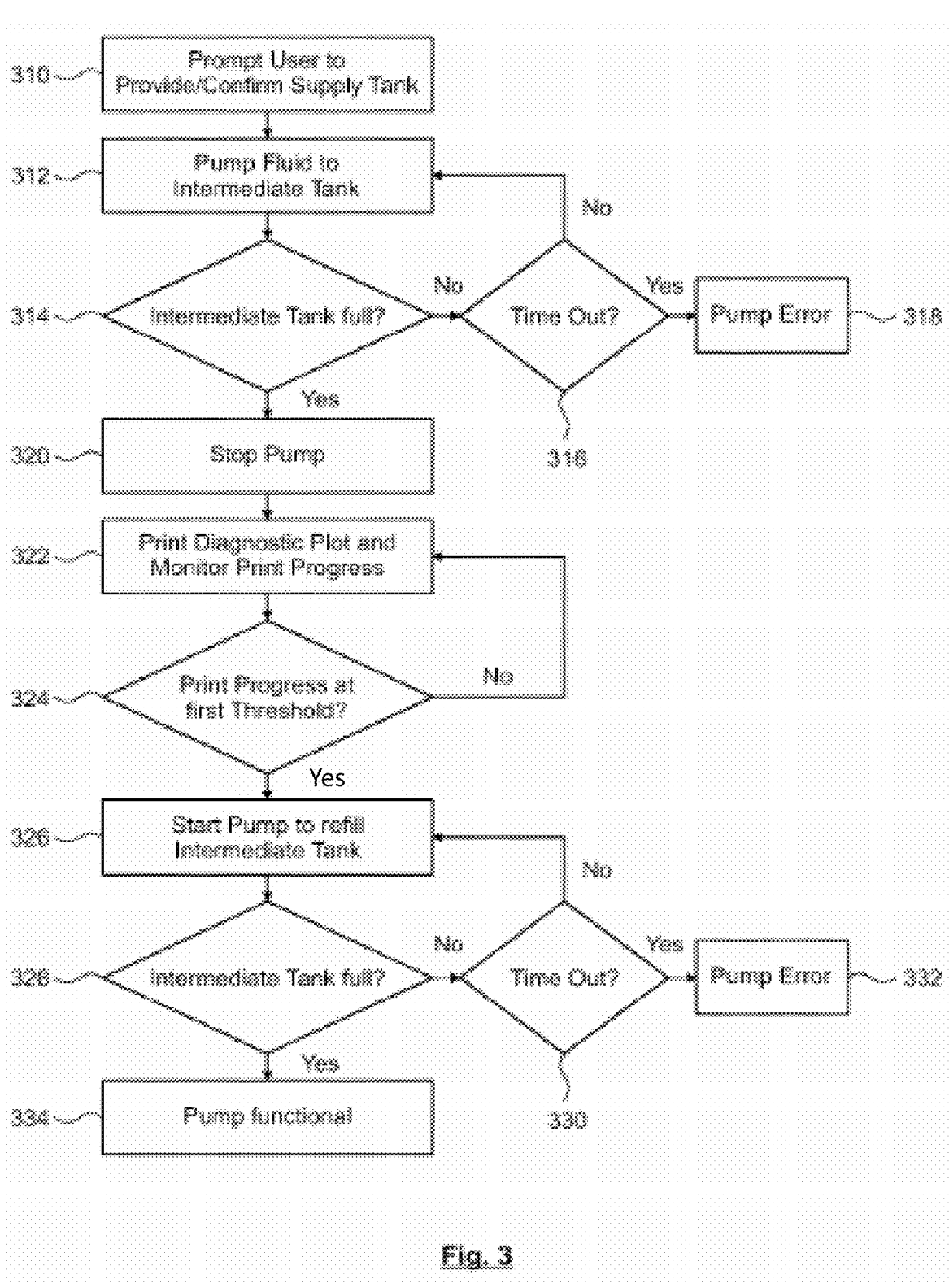
FIG. 3 shows a flow diagram of a method of monitoring a fluid supply according to another example.

FIG. 3 shows a flow diagram of a method of monitoring a fluid supply, according to another example. Also this method may be applied to a printer, including 2D and 3D printers, large-format printers and plotters, the printer including a supply tank 110, an intermediate tank 120 and a fluid pump 150 operatively coupled to the supply tank 110 and the intermediate tank 120. As one example, the method can be applied to the printer shown in FIG. 1 but also can be applied to other types of printers and similar devices. Use of the reference numbers as shown in FIG. 1 should not imply that the method is to be performed with the printer of FIG. 1 but it is applicable also to other printer configurations. Use of the reference numbers is for illustration purposes.

In the method of FIG. 3, a user is prompted to provide a supply tank 110 including a minimum amount of printing fluid or having a minimum fluid level or to confirm that such a supply tank 110 is present and ready to be used, at 310. The user may be prompted through a user interface of a printer or of a computer or mobile device associated with the printer. At 312, printing fluid is pumped from the supply tank 110 to the intermediate tank 120 using the fluid pump 150. While printing continues, at 314, it is checked whether the intermediate tank 110 is full or has reached some other defined first fluid level. The fluid level of the intermediate tank 110 can be checked using level sensors 162, 164, shown in FIG. 1, for example. If the intermediate tank 120 is not determined to be full, at 316, it is checked whether a time-out has occurred, i.e. whether filling of the intermediate tank 120 from the supply tank 110 takes longer than expected. If yes, at 318, a pump error can be generated by the controller 140 and issued to a user or a service person or service unit, e.g. via the user interface. If the refill time is as expected, no time-out occurs, and the fluid pump 150 continues to supply printing fluid from the supply tank 110 to the intermediate tank 120. Once it is detected that the intermediate tank 120 is full, at 314, the fluid pump 150 is stopped, at 320.

At this point, at 322, printing of a diagnostic plot is started and print progress is monitored. Printing of the diagnostic plot proceeds while printing fluid is supplied from the intermediate tank 120 to the printhead 130. As illustrated above, the diagnostic plot may be a diagnostic image, such as a flat 2D image printed on a flat print medium but also may include ejecting a printing fluid to a print bed of a 3D printer. Printing of the diagnostic plot implies feeding a defined amount of printing fluid from the intermediate tank 120 to the printhead 130.

After printing has started, print progress is monitored and it is checked, at 324, whether print progress has reached a first threshold which implies that a first defined amount of printing fluid has been fed from the intermediate tank 120. This also implies that the fluid level of the intermediate tank 120 has decreased by approximately the defined amount. Accordingly, once print progress has reached the first threshold, the fluid pump 150 is started to refill the intermediate tank 120, at 326. At this time, printing continues. Print progress can be determined based on an amount of time lapsed or based on a defined portion of the diagnostic image having been printed, for example.

While printing continues and the intermediate tank 120 is refilled from the supply tank 110 using the fluid pump 150, the fluid level of the intermediate tank 120 is checked and it is determined whether the intermediate tank 120 is full or has reached a defined fluid level, at 328. The fluid level of the intermediate tank 110 can be checked using level sensors 162, 164, shown in FIG. 1, for example. If the intermediate tank 120 is not determined to be full, at 328, it is checked whether a time-out has occurred, i.e. whether filling of the intermediate tank 120 from the supply tank 110 takes longer than expected, at 330. If yes, at 332, a pump error can be generated by the controller 140 and issued to a user or a service person or service unit, e.g. via the user interface. If the refill time is as expected, no time-out occurs, and the fluid pump 150 continues to supply printing fluid from the supply tank 110 to the intermediate tank 120. Once it is detected that the intermediate tank 120 is full or has reached a defined level within a specified time, at 328, the fluid pump 150 is diagnosed as correctly operating, at 334. For further details, reference is made to the description of FIGS. 1 and 2 above, e.g. with regards to examples of determining that the intermediate tank 120 is full or has reached a defined level or that a timeout has occurred has occurred. Further, whereas examples relates to a scenario where is checked whether the intermediate tank 120 is full, a similar diagnostic process can be based on monitoring whether the intermediate tank 120 is filled up to a defined fluid level detectable by level sensors 162, 164.

Figure 4:
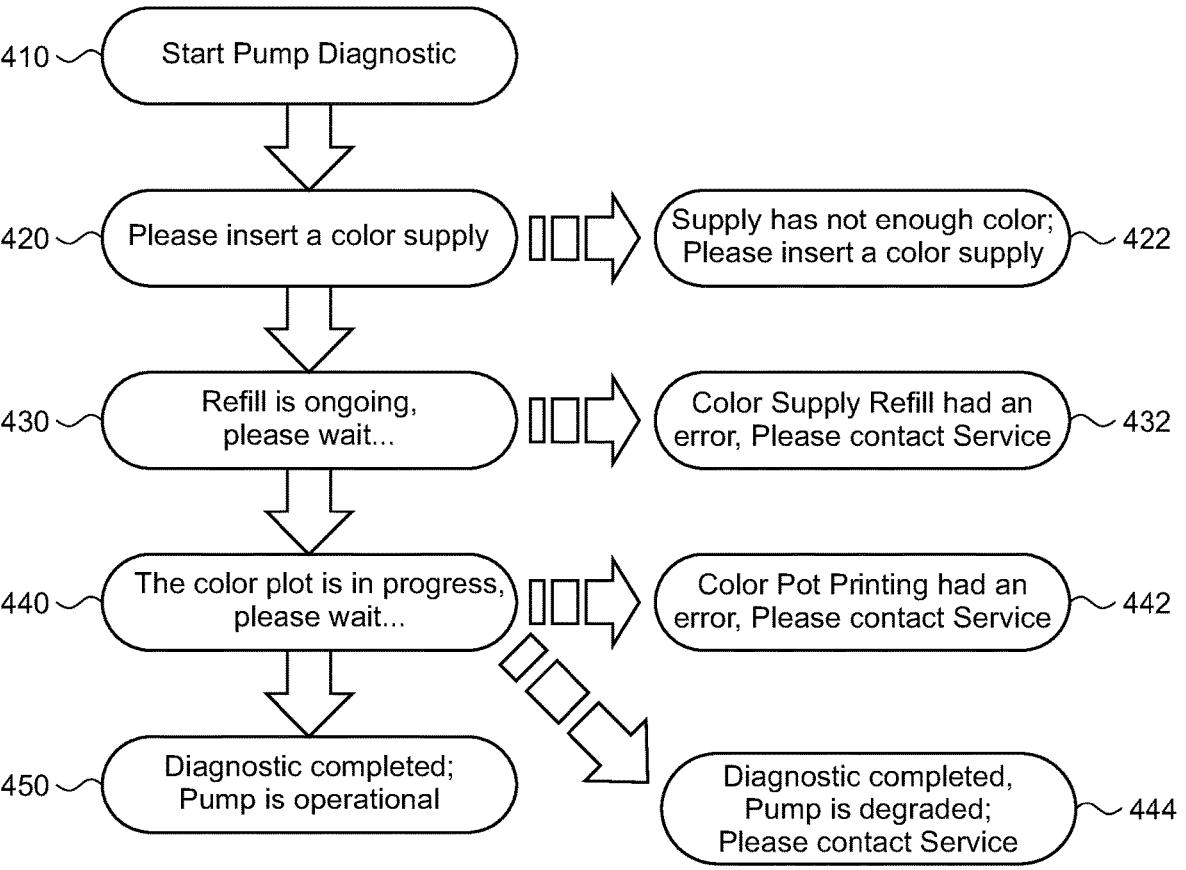
FIG. 4 shows a schematic diagram of a user interface of a printer according to an example.

FIG. 4 shows a schematic diagram of a user interface 400 of a printer according to an example. The user interface may be used to prompt a user to perform certain tasks or input certain information and to inform the user about progress of a diagnostic process, such as one of the diagnostic processes illustrated above. The user interface 400 may be used in or for a printer 100, including 2D and 3D printers, large-format printers and plotters, the printer 100 including a supply tank 110, intermediate tank 120 and a fluid pump 150 operatively coupled to the supply tank 110 and the intermediate tank 120. As one example, the method can be applied to the printer shown in FIG. 1 but also can be applied to other types of printers and similar devices. Use of the reference numbers as shown in FIG. 1 should not imply that the method is to be performed with the printer of FIG. 1 but it is applicable also to other printer configurations. Use of the reference numbers is for illustration purposes.

The user interface 400 may be coupled to the controller 140 and may be provided on a display of the printer 100 or of a computer or mobile device associated with the printer. A display incorporating the user interface 400 may include a touch screen.

The user interface 400 may be used to guide a user through a diagnostic process and to inform the user about progress of the diagnostic process. The user interface 400 may include an entity 410 to allow the user to trigger printing of the diagnostic plot or diagnostic image. The entity 410 to trigger printing of the diagnostic plot may be invoked manually by the user or automatically by the controller 140 upon detecting an issue with the print fluid supply. An issue of the print fluid supply may be detected by the user if a printed image shows quality defects, such as a lower than expected color density of one or several printed colors, in spite of the supply tank 110 having a sufficient printing fluid amount. As another example, an issue of the print fluid supply may be detected by the controller if a time-out occurs during supply of printing fluid from the supply tank 110 to the intermediate tank 120. In this and other situations, the entity 410 to trigger printing of the diagnostic plot may prompt the user to start a pump diagnostic process. This may involve signaling a respective message to the user on a display giving the user the possibility to start the diagnostic process by an input via the user interface 400, for example. At this time, the user may also select for which color or type of printing fluid to perform the diagnostic process.

Once the diagnostic process has been started, the user interface 400 may provide an entity 420 to prompt the user to provide a fluid supply 110 with a minimum amount of printing fluid stored therein. In response, the user may insert a fluid supply 110 of a respective ink type or color having a defined minimum amount of printing fluid stored therein and confirm this via the user interface 400; or, if a fluid supply 110 having a sufficient amount of printing fluid is present, the user also may confirm this via the user interface 400. Once the confirmation has been received by the user interface 400, the controller 140 can check whether a fluid supply 110 having a sufficient amount of printing fluid is present and, if this is not the case, issue a respective message to the user via an entity 422. The diagnostic process then may be put on hold until the requested fluid supply 110 has been provided or until a time-out occurs.

Once the requested fluid supply 110 is present, the diagnostic process proceeds by starting to print a diagnostic plot or image, as illustrated above. In one example, the diagnostic process may be similar to or as illustrated with reference to FIG. 3. An entity 430 may inform the user about the progress of the diagnostic process, including filling of the intermediate tank 100 to a defined first fluid level, using the fluid pump 150. The entity 430 may ask the user to wait until the intermediate tank 110 has been detected to be full or to be at the defined first fluid level. If filling of the intermediate tank 110 takes longer than expected, a time-out may occur and an entity 432 may be provided to inform the user that an error occurred during refilling of the intermediate tank 120 from the supply tank 110. The entity 422 may advise the user to a contact service person or service unit.

If the intermediate tank 120 has been successfully filled to the defined first fluid level, the fluid pump 150 would be stopped and printing of the diagnostic plot may start. An entity 440 may be provided to inform the user that printing of the diagnostic plot is ongoing and ask the user to wait. In another example, the entity 440 may prompt the user to insert a print medium into the printer and manually start printing of the diagnostic plot by a respective input at the user interface 400. During printing of the diagnostic plot, as illustrated above, after a defined portion of the diagnostic plot has been printed, the fluid pump 150 is reactivated to refill the intermediate tank 120 from the supply tank 110. This happens automatically, under the control of the controller 140, as illustrated above, and the user is further asked to wait, by entity 440.

If, during the course of printing the diagnostic plot, the printhead experiences an error, e.g. due to insufficient supply with printing fluid, the diagnostic process is terminated and an entity 442 is provided to inform the user that printing of the diagnostic plot created an error. The user may be advised to contact a service person or service unit.

Further, as illustrated above, while printing of the diagnostic plot is ongoing and while the intermediate tank 120 is being refilled from the supply tank 110, the fluid level of the intermediate tank 120 is monitored. As illustrated above, if the time to refill the intermediate tank 120 takes longer than expected, operation of the fluid pump is diagnosed as being degraded and an entity 444 is provided to inform the user that the diagnosis is completed and that the result of the diagnosis is that the fluid pump may be degraded. The user may be advised to contact a service person or unit.

If, on the other hand, the time to refill the intermediate tank 120 is as expected or less, operation of the fluid pump is diagnosed as being correct and entity 450 is provided to inform the user that the diagnosis is completed and that the result of the diagnosis is that the fluid pump operates correctly.

An entity of the user interface 400 may refer to a field or icon on a screen to display information to the user or to another format of conveying information to the user, including the generation of visual, tactile and/or audible signals to inform the user about progress of the diagnostic process, of the result of the diagnostic process and/or of any warning and advisory messages. An entity of the user interface 400 additionally or alternatively may refer to a field, key, button or any other input device to allow the user to input information into the user interface and/or control the diagnostic process.

The description is not intended to be exhaustive or limiting to any of the examples described above. The printer, method and user interface disclosed herein can be implemented in various ways and with many modifications without altering the underlying basic properties. The methods and user interface can be implanted in a printer as shown in FIG. 1, including variations of that printer and other types of printers, as outlined above. Moreover, the aspects of the printer, the methods and the user interface described herein can be combined, in total and in part, and can be modified within the scope of the following claims.

The invention claimed is:

1. A method of monitoring a printing fluid supply, the printing fluid supply including a supply tank, an intermediate tank and a fluid pump operatively coupled to the supply tank and the intermediate tank; the method comprising with the intermediate tank having a defined first printing fluid level, starting to feed printing fluid from the intermediate tank;

when a defined amount of printing fluid has been fed from the intermediate tank to a printhead, with the feeding of printing fluid from the intermediate tank proceeding, activating the fluid pump to supply printing fluid from the supply tank to the intermediate tank;

monitoring the printing fluid level of the intermediate tank while the fluid pump remains activated; and diagnosing operation of the fluid pump as a function of the printing fluid level of the intermediate tank.

2. The method of claim 1 wherein diagnosing operation of the fluid pump comprises:

monitoring a time period from activation of the fluid pump until a defined second printing fluid level of the intermediate tank is detected; and if the time period is below a threshold value, diagnosing operation of the fluid pump as correct.

3. The method of claim 2, further comprising:

if the time period is above the threshold value, diagnosing operation of the fluid pump as degraded.

4. The method of claim 2, wherein the defined first printing fluid level and the defined second printing fluid level are the same.

5. The method of claim 2, wherein at least one of the defined first printing fluid level and the defined second printing fluid level corresponds to the intermediate tank detected as full.

6. The method of claim 1, further comprising, before starting to feed printing fluid from the intermediate tank:

providing the supply tank with at least a minimum amount of printing fluid therein;

activating the fluid pump to supply printing fluid from the supply tank to the intermediate tank until the defined first printing fluid level is reached in the intermediate tank; and stopping the fluid pump.

7. The method of claim 1, wherein the intermediate tank is in fluid communication with a printhead, wherein feeding printing fluid from the intermediate tank comprises:

feeding the printing fluid from the intermediate tank to the printhead to print a diagnostic image, and wherein determining that the defined amount of printing fluid has been fed from the intermediate tank comprises:

monitoring a time period of printing the diagnostic image, the time period corresponding to an amount of printing fluid fed from the intermediate tank to the printhead.

8. The method of claim 7, wherein the fluid pump is activated to supply printing fluid from the supply tank to the intermediate tank at a defined time after printing of the diagnostic image has started; and printing of the diagnostic image continues while the fluid pump is activated to supply printing fluid from the supply tank to the intermediate tank.

9. The method of claim 1, wherein the monitoring the printing fluid level of the intermediate tank while the fluid pump remains activated is performed while the fluid pump remains activated via a differential pressure sensor.

10. The method of claim 9, wherein the differential pressure sensor operates based on a pressure difference between air pressure supplied to the intermediate tank and fluid pressure inside the intermediate tank.

11. A printer comprising a supply tank, an intermediate tank, a printhead, a printing fluid pump in fluid communication with the supply tank and the intermediate tank, a printing fluid connection between the intermediate tank and the printhead, a printing fluid level sensor at the intermediate tank, and a controller programmed to:

activate the printing fluid pump to fill the intermediate tank with printing fluid from the supply tank;

deactivate the printing fluid pump when the printing fluid level sensor detects that a defined first printing fluid level in the intermediate tank has been reached;

control the printhead to print a diagnostic image;

reactivate the printing fluid pump to refill the intermediate tank with printing fluid from the supply tank after a defined portion of the diagnostic image has been printed;

monitor the printing fluid level of the intermediate tank while the printing fluid pump is activated; and diagnose operation of the printing fluid pump as a function of the printing fluid level of the intermediate tank.

12. The printer of claim 11, wherein the controller is further programmed to diagnose operation of the printing fluid pump as a function of a time needed to reach a defined second printing fluid level in the intermediate tank after re-activation of the printing fluid pump while printing of the diagnostic image.

13. The printer of claim 11, comprising a number of pairs of a supply tank and an intermediate tank respectively in fluid communication via an associated printing fluid pump, each pair and associated printing fluid pump associated with a dedicated printing fluid color, wherein the controller is further programmed to independently control the printing fluid pumps associated with different printing fluid colors.

14. The printer of claim 11, further comprising:

a user interface to prompt a user to control or trigger at least part of a diagnostic process.

15. The printer of claim 11, wherein the printing fluid level sensor comprises a differential pressure sensor.

16. The printer of claim 15, wherein the differential pressure sensor operates based on a pressure difference between air pressure supplied to the intermediate tank and fluid pressure inside the intermediate tank.

17. A user interface of a printer, comprising:

a first entity to allow a user to trigger printing of a diagnostic plot;

a second entity to prompt a user to provide a printing fluid supply with a minimum amount of printing fluid stored therein;

a third entity to inform the user about progress of a diagnostic operation including information about at least one of a printing fluid refill progress and information about a printing progress; and a fourth entity to inform the user about a diagnostic result as a function of the printing fluid refill progress and the printing progress, wherein the diagnostic result includes a diagnosis of an operation of a printing fluid pump as incorrect if a time period of printing fluid refilling progress is above a threshold value.

18. The user interface of claim 17, wherein the printing fluid refill progress relates to refilling an intermediate tank from a printing fluid supply during the printing of the diagnostic plot, the intermediate tank supplying printing fluid to a printhead for printing the diagnostic plot.

19. The user interface of claim 18, further comprising at least one of:

a fifth entity to inform the user if the printing fluid supply holds insufficient printing fluid;

a sixth entity to inform the user if the printing fluid refill progress exhibits an error; and the fourth entity to inform the user that a diagnostic process has been completed.

20. The user interface of claim 17, wherein the third entity comprises a differential pressure sensor that operates based on a pressure difference between air pressure supplied to an intermediate tank and fluid pressure inside the intermediate tank.

* * * * *